(12) United States Patent
Beidas et al.

(10) Patent No.: US 8,331,511 B2
(45) Date of Patent: Dec. 11, 2012

(54) SYSTEM AND METHOD FOR COMPENSATING FOR NONLINEAR INTERFERENCE CANCELLATION IN MULTI-CARRIER TRANSMISSION

(75) Inventors: Bassel Beidas, Alexandria, VA (US); Rohit Iyer Seshadri, Gaithersburg, MD (US)

(73) Assignee: Hughes Network Sysetms, LLC, Germantown, MD (US)

( * ) Notice: Subject to any disclaimer, the term of this patent is extended or adjusted under 35 U.S.C. 154(b) by 546 days.

(21) Appl. No.: 12/637,154

(22) Filed: Dec. 14, 2009

(65) Prior Publication Data

US 2010/0183106 A1    Jul. 22, 2010

Related U.S. Application Data

(60) Provisional application No. 61/140,691, filed on Dec. 24, 2008.

(51) Int. Cl.
*H04B 1/00* (2006.01)

(52) U.S. Cl. ....... 375/349; 375/148; 375/350; 455/63.1; 455/67.11; 455/303

(58) Field of Classification Search .................. 375/144, 375/148, 230, 232, 346, 349, 350; 455/501, 455/63.1, 67.11, 67.13, 202, 226.1, 226.2, 455/226.3, 296, 303, 306, 307, 239.1

See application file for complete search history.

(56) References Cited

U.S. PATENT DOCUMENTS

| | | | | |
|---|---|---|---|---|
| 7,286,598 | B2 * | 10/2007 | Kochale et al. | 375/232 |
| 7,298,711 | B1 * | 11/2007 | Jarcy | 370/286 |
| 8,170,502 | B2 * | 5/2012 | Seshadri et al. | 455/102 |
| 2008/0253439 | A1 * | 10/2008 | Shakiba et al. | 375/232 |

* cited by examiner

*Primary Examiner* — Dac Ha
(74) *Attorney, Agent, or Firm* — K&L Gates LLP

(57) ABSTRACT

An aspect of the present invention is drawn to a receiver operable to receive a first signal transmitted on a first carrier and to receive a second signal transmitted on a second carrier. The receiver includes a first filter, a second filter and a nonlinear compensator. The first filter is arranged to receive the first signal and to generate a first filtered signal. The second filter is arranged to receive the second signal and to generate a second filtered signal. The nonlinear compensator is arranged to output a first compensating signal based on the first filtered signal and the second filtered signal and to output a second compensating signal based on the first filtered signal and the second filtered signal. Further, the nonlinear compensator can reduce one of nonlinear interference within the first filtered signal and nonlinear interference between the first filtered signal and the second filtered signal.

20 Claims, 8 Drawing Sheets

SYSTEM AND METHOD FOR COMPENSATING FOR NONLINEAR INTERFERENCE CANCELLATION IN MULTI-CARRIER TRANSMISSION

The present application claims priority from U.S. Provisional Application No. 61/140,691 filed Dec. 24, 2008, the entire disclosure of which is incorporated herein by reference.

BACKGROUND

The present invention is generally drawn to receivers for use with transmitters having High Power Amplifiers (HPAs), for example in satellite communications. Satellite communication systems must transmit signals vast distances from earth to satellites in orbit and vice-versa. A communication system may include a transmitter having an HPA or a transponder that includes a transmitter having an HPA. If a transmitter (or transmitter section of a transponder) is located in a space-based satellite, there is limited access thereto. Accordingly, compensating for the distortion associated with an HPA within a space-based satellite transmitter is much more complicated than compensating for the distortion associated with an HPA within a ground-based transmitter. Additionally, satellites in general have strict power consumption limits that require the communication systems to operate at very high efficiencies of both power use and usage of available communication bandwidth.

Many satellites use HPAs for communication purposes. Typically, HPAs operate most efficiently at (or near) saturation. Unfortunately, operation of HPAs at (or near) saturation can lead to inter symbol interference (ISI) and spectral spreading in output carriers.

The output of a transmitter can be seen as a sequence of symbols called a phrase. Each symbol represents a sequence of bits, in the case of 8PSK, each symbol represents 3 bits. A transmitter will output the phrase one symbol at a time during transmission. As a transmitter shifts from one symbol to the next in the phrase, previous and future output symbols may cause interference in the output of the current symbol. This interference in the current symbol caused by past and future symbols is ISI.

Due to physical limitations, there is a maximum number of HPA units that can fit in a transponder. Sharing multiple carriers by a single transponder HPA allows for transmitting more data and servicing more users without exceeding this physical limitation. Another benefit of this multicarrier operation is that it allows for reducing the transmission symbol rate per carrier without sacrificing system throughput. This greatly eases the burden on hardware implementation.

However, when multiple carriers are amplified by way of a single HPA, the HPA causes spectral spreading, wherein the information transmitted on one carrier can "bleed over" into information transmitted on an adjacent carrier, which is referred to as adjacent carrier interference (ACI). Ideally, the frequencies of adjacent carriers should be as close as possible. However, as the frequencies of adjacent carriers are brought closer together, many components of the ACI increase.

To further complicate matters, amplifying multiple carriers by way of a single HPA introduces nonlinear distortions, which include nonlinear components of ISI and nonlinear components of ACI, that further decrease information quality within each carrier. These nonlinear components of ISI and one component of nonlinear ACI are independent of the carrier spacing. In other words, the nonlinear components of ISI and one component of nonlinear ACI will not decrease even if the carriers are spaced far apart on a spectrum.

Conventional satellite communication systems with HPAs have been able to address ISI over a single carrier. Conventional satellite communication systems with HPAs that have addressed ISI have not been able to additionally correct for ACI. Accordingly, conventional satellite communication systems with HPAs that have addressed ISI are not able to transmit over a plurality of carriers.

In essence, conventional satellite communication systems with HPAs are able to: drive the HPA in or near saturation while efficiently communicating over a single carrier; or inefficiently communicate over a plurality of carriers without driving the HPA in or near saturation.

What is needed is a method of compensation that addresses both linear and nonlinear ISI and linear and nonlinear ACI due to nonlinearity of HPA and tight crowding of carriers in a transmitter HPA or transmitter section of a transponder HPA, particularly when multiple carriers share a single HPA.

BRIEF SUMMARY

It is an object of the present invention to provide a system and method for compensation that addresses both linear and nonlinear ISI and linear and nonlinear ACI due to nonlinearity of HPA and tight crowding of carriers in a transmitter HPA or transmitter section of a transponder HPA.

In accordance with an aspect of the present invention, a receiver is operable to receive a first signal transmitted on a first carrier and to receive a second signal transmitted on a second carrier. The receiver includes a first filter; a second filter and a nonlinear compensator. The first filter is arranged to receive the first signal and to generate a first filtered signal. The second filter is arranged to receive the second signal and to generate a second filtered signal. The nonlinear compensator is arranged to output a first compensating signal based on the first filtered signal and the second filtered signal and to output a second compensating signal based on the first filtered signal and the second filtered signal. Further, the nonlinear compensator can reduce one of nonlinear interference within the first filtered signal and nonlinear interference between the first filtered signal and the second filtered signal.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
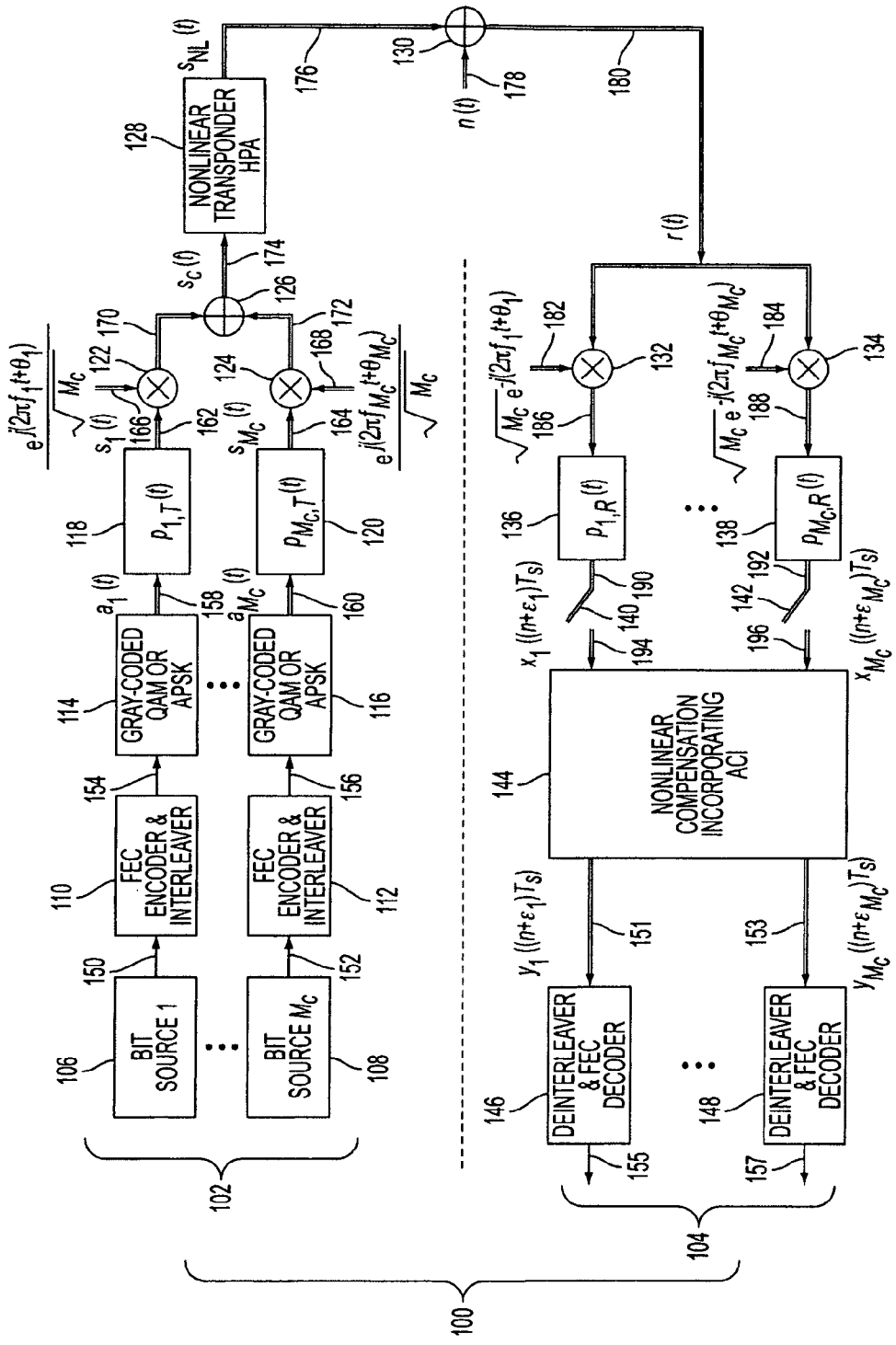
FIG. 1 illustrates an example communication system.

Aspects of the present invention enable both high bandwidth efficiency and high power efficiency for satellite communications systems. High bandwidth efficiency is achieved by spacing carriers tightly and by employing high-level modulations that uses a large alphabet size, for example an alphabet size greater than 8. High power efficiency is achieved by driving the transponder HPA closer to its saturation point.

However, as discussed above, operating multi-carriers through the same transponder HPA when driven near its saturation creates large amount of nonlinear ISI and more significantly nonlinear ACI. In accordance with aspects of the present invention, a non-linear combiner is used address: 1) linear ISI components; 2) nonlinear ISI components; 3) linear ACI components; and 4) nonlinear ACI components within a multi-carrier communication system. In one aspect of the present invention, the non-linear combiner includes an adaptive polynomial filter for linear ISI, nonlinear ISI, linear ACI and nonlinear ACI equalization. In another aspect of the present invention, the non-linear combiner includes an adaptive polynomial filter for linear ISI, nonlinear ISI, linear ACI and nonlinear ACI cancellation.

An adaptive polynomial filter is a nonlinear generalization of an adaptive linear filter that is based on nonrecursive or recursive linear difference equations. Some embodiments in accordance with the present invention use a more specific species of such polynomial filters, referred to as Volterra filters, which are based on the Volterra series. Therefore, in accordance with aspects of the present invention, either a Volterra equalizer or a Volterra interference canceller may be used to reduce the effects of linear and nonlinear ISI and linear and nonlinear ACI. Example embodiments in accordance with aspects of the present invention are adaptive so they are completely blind to unknown transponder HPA characteristics, and can rapidly respond to varying operating back-off levels.

Aspects in accordance with the present invention are described with two example adaptive solutions, trading off performance and complexity, to compensate for nonlinear ISI and ACI. The first example solution performs adaptive inverse modeling of the interference impulse response and then applies an equalizer on the main path of the received signal. The second example solution performs adaptive identification of the interference impulse response and then applies cancellation of the estimated interference.

In accordance with another aspect of the present invention, a Volterra filter uses a plurality of sample vector inputs, i.e., one sample vector input corresponding to the carrier of interest and the other sample vector inputs corresponding to the other adjacent carriers, wherein the output is based on products and cross-products of the plurality of sample vector inputs. This may be contrasted with a conventional Volterra filter that uses a single sample vector input, wherein the output is based only on a product of the single sample vector input.

FIG. 1 illustrates an example communication system 100 in accordance with an aspect of the present invention. For purposes of discussion, communication system 100 includes two carriers. However a communication system having more than two carriers may be used in accordance with the present invention.

As illustrated in the figure, communication system 100 includes a transmission section 102 and a receiver section 104. Transmission section 102 includes a signal source 106, a signal source 108, an encoder 110, an encoder 112, a modulator 114, a modulator 116, a filter 118, a filter 120, a mixer 122, a mixer 124, an adder 126 and an amplifier 128.

Encoder 110 and encoder 112 may be, for example, error correction encoders that add information to reduce information loss at receiver section 104. Modulator 114 and modulator 116 may be any known type modulator. In an example embodiment, modulator 114 and modulator 116 may be Gray-coded Quadrature Amplitude Modulation (QAM) or Amplitude and Phase Shift Keyed (APSK) modulators, wherein adjacent symbols in the modulation scheme of modulator 114 and modulator 116 differ only by a single bit. Operation of transmission section 102 will be described below.

In operation, a first carrier is associated with signal source 106. Signal source 106 outputs a source signal 150. Encoder 110 receives source signal 150 and generates en encoded signal 154. Modulator 114 receives encoded signal 154 and generates a modulated signal 158. Modulated signal 158 is input to filter 118, which generates a filtered signal 162. Mixer 122 mixes filtered signal 162 with a local oscillator signal 166 to generate a first carrier signal 170.

In operation, a second carrier is associated with signal source 108. Signal source 108 outputs a source signal 152. Encoder 112 receives source signal 152 and generates an encoded signal 156. Modulator 116 receives encoded signal 156 and generates a modulated signal 160. Modulated signal 160 is input to filter 120, which generates a filtered signal 164. Mixer 124 mixes filtered signal 164 with a local oscillator signal 168 to generate a second carrier signal 172.

Adder 126 combines first carrier signal 170 and second carrier signal 172 to create an output signal 174. Amplifier 128 amplifies output signal 174 to generate a transmit signal 176.

Transmission section 102 may include any number of signal sources, as illustrated in the figure with dots. For every signal source, transmission section 102 would include a corresponding encoder, modulator, filter and mixer. Further, adder 126 would be arranged to add all carriers. However, for purposes of simplifying the discussion, in this example, the number of signal sources is two.

FIG. 1 shows an adder 130 adding a noise signal 178 to transmit signal 176 to generate a receive signal 180. This step illustrates a process discussed below used in analysis of an aspect of the present invention. Noise signal 178 is idealized as additive white Gaussian Boise, which is an accurate depiction of noise experienced in satellite communication systems.

Receiver section 104 includes a mixer 132, a mixer 134, a filter 136, a filter 138, a sampler 140, a sampler 142, a compensator 144, a decoder 146 and a decoder 148. Filter 136 is associated with the first carrier of the system and is accordingly matched to filter 118 of transmission section 102. Filter 138 is associated with the second carrier of the system and is accordingly matched to filter 120 of transmission section 102. Compensator 144 compensates for ISI and ACI, and in an example embodiments, may include a Volterra filter as will be discussed in greater detail below. Decoder 146 is associated with the first carrier of the system and accordingly decodes the encoding of encoder 110. Decoder 148 is associated with the second carrier of the system and accordingly decodes the encoding of encoder 112.

In operation, received signal 180 is mixed by mixer 132 with a local oscillator signal 182 to generate a received carrier signal 186. Received carrier signal 186 is input to filter 136 to generate a filtered carrier signal 190. Sampler 140 samples filtered carrier signal 190 to generate a sampled signal 194. Additionally, received signal 180 is mixed by mixer 134 with a local oscillator signal 184 to generate a received carrier signal 188. Received carrier signal 188 is input to filter 138 to generate a filtered carrier signal 192. Sampler 142 samples filtered carrier signal 192 to generate a sampled signal 196.

Compensator 144 uses sampled signal 194 and sampled signal 196 to generate a compensated signal 151, which is associated with the first carrier of communication system 100. Additionally, compensator 144 uses sampled signal 194 and sampled signal 196 to generate a compensated signal 153, which is associated with the second carrier of communication system 100. Further detail of operation of compensator 144 in accordance with an aspect of the present invention will be described below.

Compensated signal 151 is decoded by decoder 146 to generate a decoded signal 155. Compensated signal 153 is decoded by decoder 148 to generate a decoded signal 157.

Receiver section 104 may include a number of mixers equal to the number of carriers provided by transmitter section 102. However, for purposes of simplifying the discussion, in this example, the number of mixers is two.

An example compensator 144 in accordance with an aspect of the present invention may include a Volterra filter. An example Volterra filter is discussed below with reference to FIG. 2.

Figure 2:
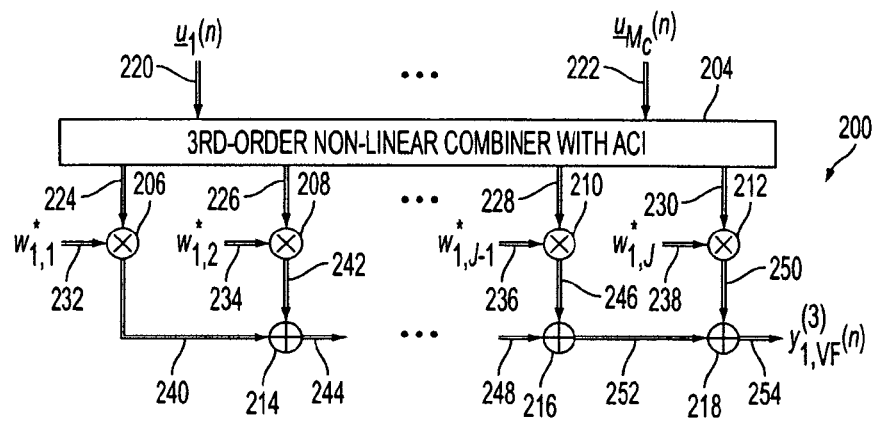
FIG. 2 illustrates an example Volterra filter in accordance with an aspect of the present invention.

FIG. 2 illustrates example a Volterra filter 200, in accordance with an aspect of the present invention. Volterra filter 200 is capable of taking as input, a plurality of vectors, and of outputting a single compensated signal. Volterra filter 200 includes a combiner 204, a multiplier 202, a multiplier 208, a multiplier 210, a multiplier 212, an adder 214, an adder 216 and an adder 218.

In operation, combiner 204 receives a plurality of symbol vectors corresponding to different carriers in the system in which Volterra filter 200 operates. Specifically, in this example where two carriers are used, combiner 204 receives a symbol vector 220 corresponding to a first carrier and a symbol vector 222 corresponding to a second carrier. Combiner 204 uses input symbol vector 220 and input symbol vector 222 to generate a plurality of output symbol vectors, used to isolate the current output on the carrier for which the filter is designed to output. Specifically, combiner 204 generates an output symbol vector 224, an output symbol vector 226, an output symbol vector 228 and an output symbol vector 230. Multiplier 206 multiplies output symbol vector 224 by a weight vector 232 to get a weighted output 240. Multiplier 208 multiplies output symbol vector 226 by a weight vector 234 to get a weighted output 242. Adder 214 adds weighted output 240 and weighted output 242 to get a first added output 244. Multiplier 210 multiplies output symbol vector 228 by a weight vector 236 to get a weighted output 246. Adder 216 adds weighted output 246 to first added output 244 to get a second added output 252. Multiplier 212 multiplies output symbol vector 230 by a weight vector 238 to get a weighted output 250. Adder 218 adds weighted output 250 to a second added output 252 to get a filtered output 254.

To compensate for linear ISI, nonlinear ISI, linear ACI and nonlinear ACI, one Volterra filter 200 is used for each carrier in communication system 100. Each Volterra filter 200 takes input from all carriers of communication system 100 and outputs on a single carrier. A plurality of such Volterra filters, e.g., one for each carrier, would therefore provide a plurality of outputs, e.g., one for each carrier. The plurality of such Volterra filters may be considered, in general, a single Volterra filter in accordance with an aspect of the present invention, wherein this Volterra filter (plurality of Volterra filters) provides a plurality of outputs.

In accordance with an aspect of the present invention, two general methods of operation of Volterra filter 200 are used. These methods will be described below with reference to FIGS. 3A and 3B.

Figure 3A:
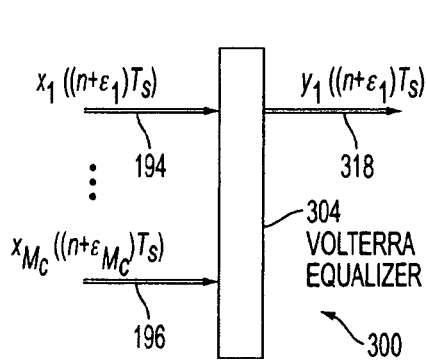
FIG. 3A illustrates an example Volterra filter used as an equalizer in accordance with an aspect of the present invention.

FIG. 3A illustrates an example Volterra filter used as a Volterra equalizer 300 in accordance with an aspect of the present invention. Volterra equalizer 300 is capable of generating a single carrier output for compensator 144 in FIG. 1. Volterra equalizer 300 includes a Volterra filter 304.

In operation, Volterra filter 304 uses sampled signal 194 and sampled signal 196 to compute the effect of linear ISI, nonlinear ISI, linear ACI and nonlinear ACI on a given carrier and generates an associated output signal 318, which is the compensated output for the given carrier. Further detail of Volterra equalizer 300 will be mathematically described later.

Figure 3B:
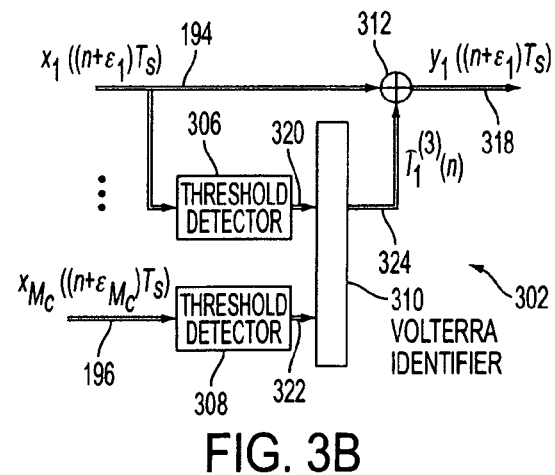
FIG. 3B illustrates an example Volterra filter used as a canceller in accordance with an aspect of the present invention.

FIG. 3B illustrates an example Volterra filter used as a Volterra canceller 302 in accordance with an aspect of the present invention. Volterra canceller 302 is capable of generating a single carrier output for compensator 144 in FIG. 1. Volterra canceller 302 includes a threshold detector 306, a threshold detector 308, a Volterra filter 310 and a subtractor 312.

In operation, sampled signal 194 is input to threshold detector 306 to generate a threshold signal 320. Sampled signal 196 is input to threshold detector 308 to generate a threshold signal 322. Volterra filter 310 uses threshold signal 320 and threshold signal 322 to compute the effect of linear ISI, nonlinear ISI, linear ACI and nonlinear ACI on a given carrier and generates an associated interference estimate signal 324. Subtractor 312 subtracts interference estimate signal 324 from sampled signal 194 to generate an output signal 318, which is the compensated output for the given carrier. Further detail of Volterra canceller 302 will be mathematically described later.

Illustration of linear ISI, nonlinear ISI, linear ACI and nonlinear ACI and effectiveness of the methods described above in accordance with an aspect of the present invention will now be described with reference to FIGS. 4A-9.

An extensive Monte-Carlo simulation study has been carried out to demonstrate the effectiveness of the two example families of adaptive compensation techniques in accordance with aspects of the present invention for the uncoded and FEC-coded situations. The simulation setup implements communication system 100, shown in FIG. 1, and considers the cases of two and four carriers modulated by either 16QAM or 16APSK with spacing of $\Delta f=1.257T_s^{-1}$. Transmit filters 118 and 120 and receive filters 136 and 138, include a matched pair of root-raised cosine (RRC) filters with a roll-off factor of 0.25. The nonlinear satellite transponder HPA model shared by the two modulated carriers follows the Saleh model. Specifically, the nonlinearity is characterized, in terms of the input amplitude r, by the following AM/AM and AM/PM conversions, respectively $$A(r) = \frac{2r}{1+r^2}; \quad \Phi(r) = \frac{\pi}{6}\frac{r^2}{1+r^2}. \tag{1}$$

Two examples of simulated power spectral densities (PSDs) for multiple carriers through an HPA will now be described with reference to FIGS. 4A-4B.

Figure 4A:
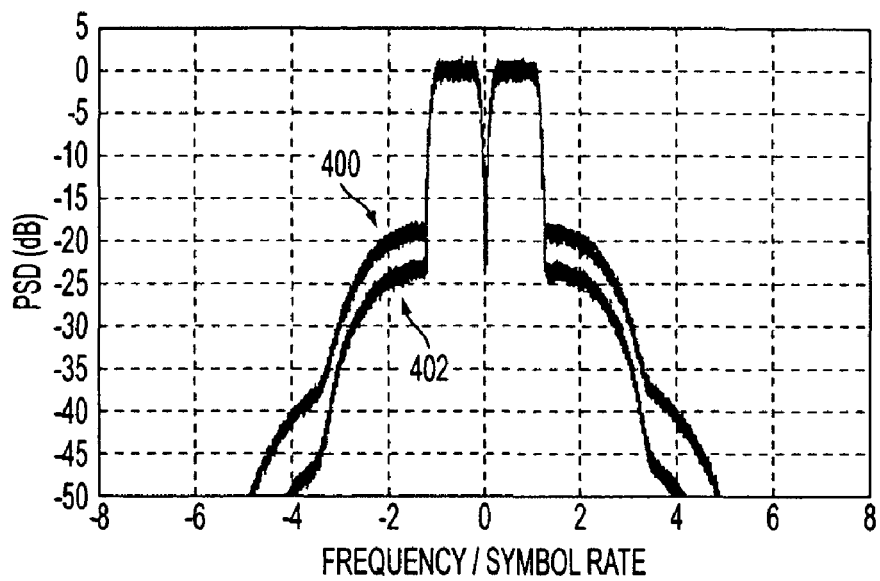
FIG. 4A illustrates an example power spectral density plot with two carriers sharing a single HPA.
Figure 4B:
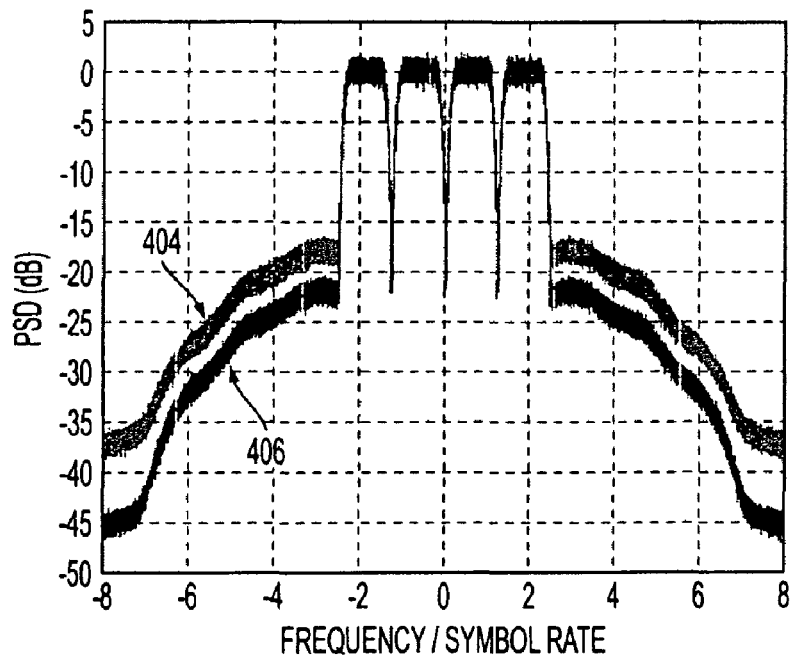
FIG. 4B illustrates an example power spectral density plot with four carriers sharing a single HPA.

FIGS. 4A-4B illustrate the simulated PSD of transmitted signal 176, for cases of multicarrier operation per nonlinear HPA when operated at two different input back-off levels.

FIG. 4A is for a two-carrier 16QAM, whereas FIG. 4B is for a four-carrier 16APSK, both at the output of the Saleh HPA. As expected, the spectral spreading as well as the nonlinear interaction are larger as the input back-off is reduced.

In the first example, FIG. 4A illustrates power spectral density (PSD) for a model of transmitted signal 176 using an example two-carrier system and a single HPA with a first example type of modulation, 16QAM modulation. The carriers are spaced such that $\Delta f=1.257T_s^{-1}$ where $\Delta f$ is the frequency spacing between the centers for adjacent carriers and $T_s^{-1}$ is the symbol rate. Additionally, the roll-off value is 0.25. The y-axis represents PSD in dB and the x-axis represents frequency/symbol rate.

In the figure, curve 402 represents the PSD for the example system using an input back-off of 9 dB, i.e., the HPA is driven at 9 dB from saturation. Curve 400 represents the PSD for the example system using an input back-off of 6 dB, i.e., the HPA is driven at 6 dB from saturation. Curve 400 shows larger spectral spreading and greater nonlinear effects than curve 402. This is expected because the system is operating closer to saturation in the case of curve 400.

In the second example, FIG. 4B illustrates power spectral density (PSD) for a model of transmitted signal 176 using an example four-carrier system and a single HPA with a second type of modulation, 16APSK modulation. The carriers are spaced such that $\Delta f=1.257T_s^{-1}$ where $\Delta f$ is the frequency spacing between the centers for adjacent carriers and is the symbol rate. Additionally, the roll-off value is 0.25. The y-axis represents PSD in dB and the x-axis represents frequency/symbol rate.

In the figure, curve 406 represents the PSD for the example system using an input back-off of 9 dB. Curve 404 represents the PSD for the example system using an input back-off of 6 dB. Curve 404 shows larger spectral spreading and greater nonlinear effects than curve 406. This is expected as the system is operating closer to saturation in the case of curve 404.

Three examples of simulated of noiseless scattered eye diagrams under different scenarios when passing two carriers modulated by 16QAM through a single Saleh HPA model, wherein the modulated OBO is set to 3.39 dB, will now be described with reference to FIGS. 5A-5C. Of the three examples, one uses no compensation, one uses a Volterra equalizer without ACI compensation and one uses a Volterra equalizer with ACI compensation in accordance with an aspect of the present invention.

Figure 5A:
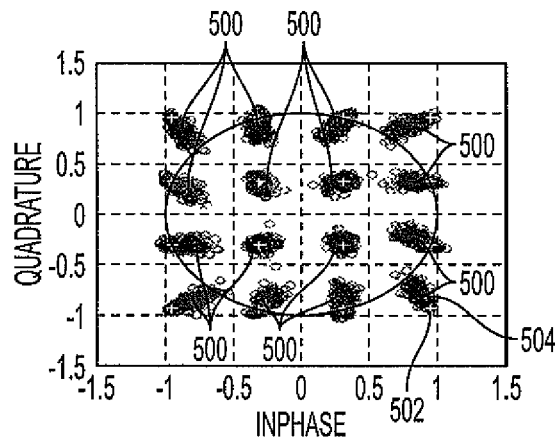
FIG. 5A illustrates an example scatter eye diagram without compensation.

FIG. 5A shows a scatter eye diagram of symbols received over a single carrier of an example system using a two-carrier system and 16QAM modulation. In this case, there is no use of a Volterra filter (only fixed amplitude and phase correction).

In the figure, symbol nodes 500 represent the ideal symbol locations for 16QAM modulation. The effect of the nonlinear distortion at the output of the receive RRC filter, is apparent. The distortion manifests itself primarily as two effects: 1) clustering, due to the memory associated with the nonlinear ISI and ACI; 2) constellation warping, i.e., the centroid of the individual clusters of points 504 are not aligned with the corresponding nominal constellation points, i.e., node 502. The amount of clustering and warping increases as the transponder HPA is driven closer to saturation.

As will be described with reference to FIGS. 5B-9 below, for an example adaptation part of the simulations resulting in the simulated PSD of transmitted signal 176, the Volterra filter taps were obtained using training sequence spanning only 4000 symbols. Performance may improve with a longer training sequence. To limit the complexity, in this example, the Volterra filter has double-sided memory that is limited to L=3 and is truncated to account for the nonlinearity up to the third-order. For an RLS algorithm, a forgetting factor $\lambda$ is set to unity. For the limited case where a least mean square algorithm is implemented for comparison purposes, the step-sizes for the linear and nonlinear components are $10^{-2}$ and $10^{-3}$, respectively.

Figure 5B:
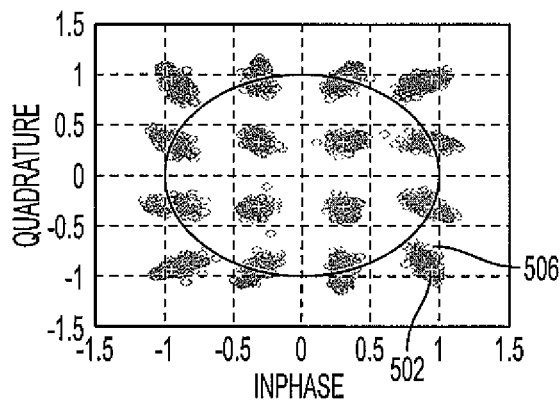
FIG. 5B illustrates an example scatter eye diagram with conventional Volterra compensation.

FIG. 5B shows a scatter eye diagram of symbols received over a single carrier of an example system using a two-carrier system and 16QAM modulation. In this case, a Volterra equalizer, similar to Volterra equalizer 300 in FIG. 3A, is used in a conventional manner. Specifically, a single carrier is passed through a Volterra filter to obtain a nonlinear correction on the single carrier.

As a result of ACI, points 506 stray from node 502. Points 506 have been processed by the Volterra equalizer associated with the system represented in FIG. 5B and can be seen to be slightly more centered around node 502 than points 504 in FIG. 5A. Volterra equalizer 300 thus reduces the warping, with marginal reduction in the clustering. This indicates that the nonlinear ACI is the dominant distortion in the system.

Figure 5C:
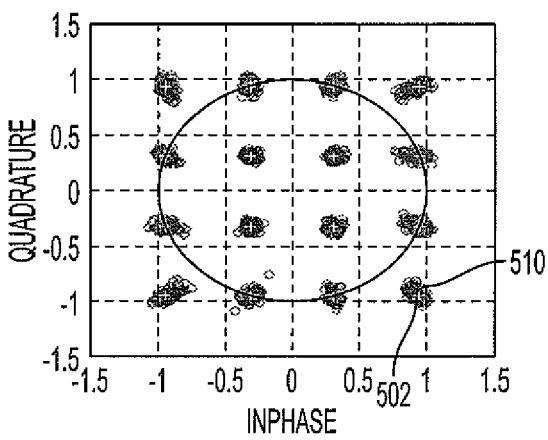
FIG. 5C illustrates an example scatter eye diagram with Volterra compensation in accordance with an aspect of the present invention.

FIG. 5C shows a scatter eye diagram of symbols received over a single carrier of an example system using a two-carrier system and 16QAM modulation. In this case, a Volterra equalizer, similar to Volterra equalizer 300 in FIG. 3A, is used in accordance with an aspect of the present invention. Correction for ACI is accomplished using method described above with reference to Volterra equalizer 300 of FIG. 3A.

As illustrated in the figure, points 510 are tightly clustered near node 502 and show minimal signs of warping and distortion as a result of ISI and ACI. Points 510 have been processed by the Volterra equalizer associated with the system represented in FIG. 5C and show a much tighter grouping around node 502 than points 504 in FIG. 5A. Volterra equalizer 300 with ACI compensation, in this example, causes a significant reduction in the clustering and a complete correction of the constellation warping.

The Volterra equalizer associated with the system represented in FIG. 5C, uses a single-sided memory of one (1). In other words, for a symbol L being analyzed, the Volterra equalizer accounts for: one symbol immediately preceding the symbol L; the symbol L; and one symbol immediately following the symbol L. An even tighter grouping around node 502 than points 510 in FIG. 5C may be achieved by increasing the size of the memory of the Volterra equalizer.

Two more examples of simulated of noiseless scattered diagrams for a two-carrier system having a nonlinear HPA will now be described with reference to FIGS. 6A-6B. Of the two examples, one uses a Volterra canceller without ACI compensation and one uses a Volterra canceller with ACI compensation in accordance with another aspect of the present invention.

Figure 6A:
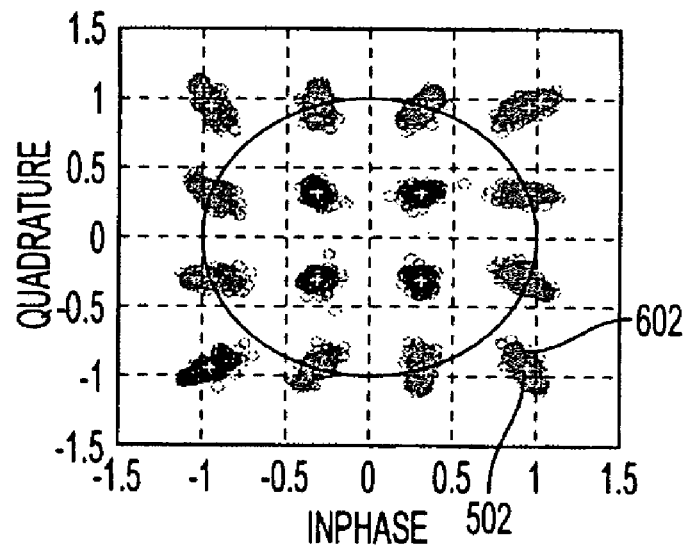
FIG. 6A illustrates an example scatter eye diagram with conventional Volterra compensation.

FIG. 6A shows a scatter eye diagram of symbols received over a single carrier of an example system using a two-carrier system and 16QAM modulation. In this case, a Volterra canceller, similar to Volterra canceller 302 in FIG. 3B, is used in a conventional manner. Specifically, a single carrier is passed through a Volterra canceller to obtain a nonlinear correction on the single carrier.

As a result of ACI, points 602 stray from node 502. Points 602 have been processed by the Volterra canceller associated with the system represented in FIG. 5A and can be seen to be slightly more centered around node 502 than points 504 in FIG. 5A.

Figure 6B:
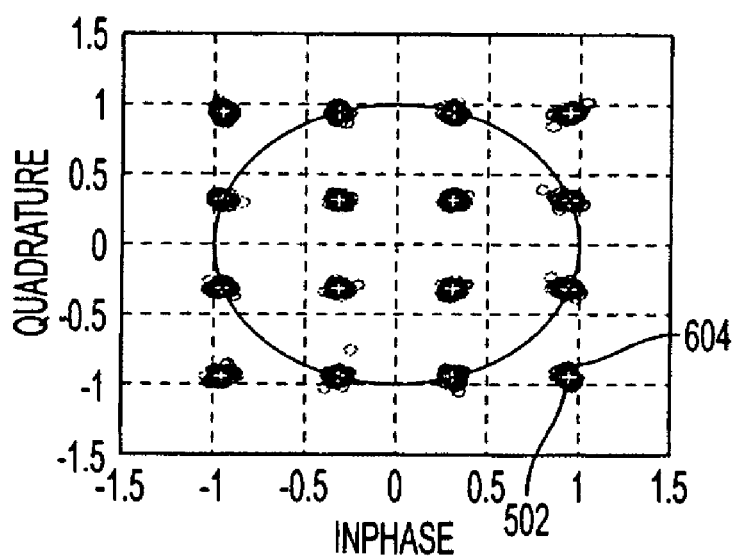
FIG. 6B illustrates an example scatter eye diagram with Volterra compensation in accordance with an aspect of the present invention.

FIG. 6B shows a scatter eye diagram of symbols received over a single carrier of an example system using a two-carrier system and 16QAM modulation. In this case, a Volterra canceller, similar to Volterra canceller 302 in FIG. 3B, is used in accordance with an aspect of the present invention. Correction for ACI is accomplished using method described above with reference to Volterra canceller 302 of FIG. 3B.

As illustrated in the figure, points 604 are tightly clustered near node 602 and show minimal signs of warping and distortion as a result of ISI and ACI. Points 604 show a much tighter grouping around node 502 than points 602 in FIG. 6A. The performance improvement is this example is even higher than the performance improvement in the example discussed with reference to FIG. 5C. This suggests that for training sequences of comparable length, the estimate of the nonlinear channel is more accurate than the estimate of its inverse for the type of transponder HPA model used.

As will be described below with reference to FIGS. 7A-9, the performance is quantified in terms of the total degradation concept incurred at a target bit error rate as a function output back-off (OBO).

Two examples of simulated performance for a two-carrier system having a nonlinear Saleh HPA will now be described with reference to FIGS. 7A-7B. Of the two examples, one is drawn to a 16QAM modulation scheme whereas the other is drawn to a 16APSK modulation scheme.

Figure 7A:
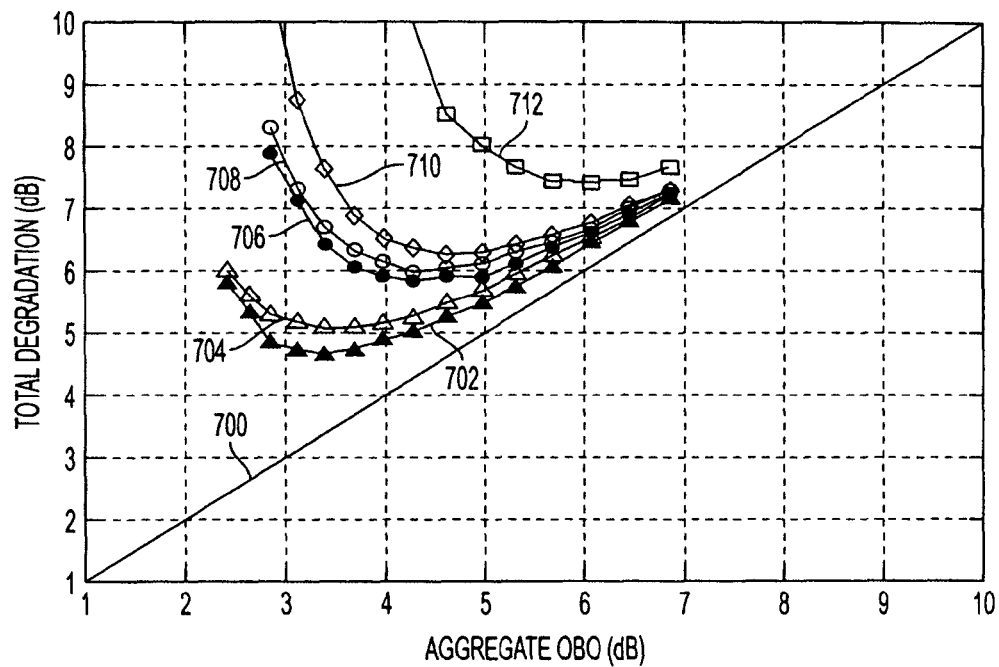
FIG. 7A illustrates compared degradation for a plurality of implementations for a two-carrier system sharing a single HPA.

FIG. 7A shows the total signal degradation in dB as a function of the output back-off in dB. The system used to generate the outputs represented in FIG. 7A is a two-carrier 16QAM system using carrier spacing of $\Delta f = 1.257 T_s^{-1}$ and roll-off of 0.25. For the system used to generate the outputs represented FIG. 7A, the target uncoded bit error rate is $10^{-3}$.

Curve 700 is the results for a linear transmitter over a single-carrier. Curve 712 is the results for the two-carrier 16QAM system without any compensation. Curve 710 is the results for the two-carrier 16QAM system using a least mean square (LMS) Volterra equalizer in a conventional manner, wherein calculation of values from the Volterra equalizer uses an LMS method. Curve 708 is the results for the two-carrier 16QAM system using a recursive least-squares (RLS) Volterra equalizer in a conventional manner, wherein calculation of values from the Volterra equalizer uses an RLS method. Curve 706 is the results for the two-carrier 16QAM system using a RLS Volterra canceller in a conventional manner. Curve 704 is the results for the two-carrier 16QAM system using a RLS Volterra equalizer with ACI compensation in accordance with an aspect of the present invention. Curve 702 is the results for the two-carrier 16QAM system using a RLS Volterra canceller with ACI compensation in accordance with another aspect of the present invention.

The target uncoded bit error rate of curve 700 is $10^{-3}$, for which the required ideal per-bit SNR is $$\left. \frac{E_b}{N_0} \right|_{L,1} = 10.5 \text{ dB.}$$

For curve 712, the minimum total degradation is 7.43 dB with no compensation at an output back off (OBO) (the amount the output is "backed-off" the saturation point) of 6.1 dB. As seen in curve 710 the LMS Volterra equalizer reduces the minimum total degradation to 6.24 dB at an OBO of 4.62 dB. Replacing the LMS adaptation method with the RLS algorithm, as seen in curve 708, further reduces the minimum degradation to 5.96 dB at an OBO of 4.29 dB. The RLS canceller without ACI compensation, as seen in curve 706, further reduces the minimum degradation to 5.83 dB at the same OBO. A larger reduction in both the total degradation and the back-off is obtained using the proposed RLS Volterra equalizer and canceller when incorporating ACI compensation. As can be seen in curve 704, the RLS Volterra equalizer with ACI compensation allows one to lower the minimum total degradation to 5.08 dB at an OBO of 3.38 dB. An additional reduction of 0.4 dB in the minimum total degradation is possible, as seen in curve 702, with the RLS Volterra canceller that incorporates ACI compensation.

Figure 7B:
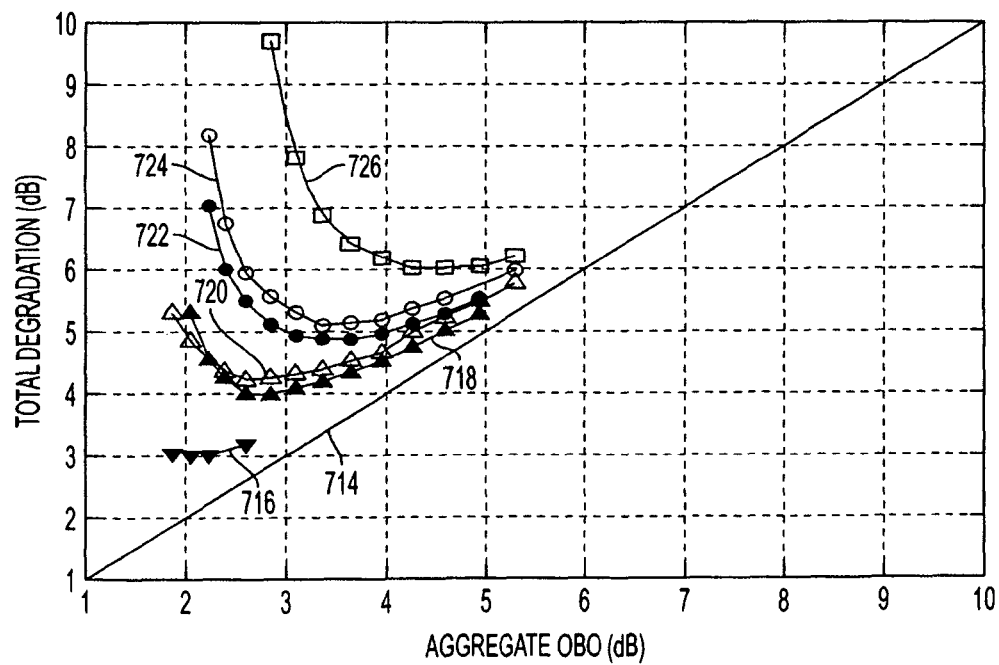
FIG. 7B illustrates compared degradation for a plurality of implementations for a two-carrier system sharing a single HPA.

FIG. 7B shows the total signal degradation in dB as a function of the output back-off in dB. The 16APSK constellation used has 4 points on an inner ring and 12 points on an outer ring, with a ring-ratio of 2.732 selected to maximize the minimum Euclidian distance. The system used to generate the outputs represented in FIG. 7B is a two-carrier 16APSK system using carrier spacing of if $\Delta f = 1.257 T_s^{-1}$ and roll-off of 0.25. In the system used to generate the outputs represented in FIG. 7B, the target uncoded bit error rate is $10^{-3}$.

In this example, the target uncoded bit error rate is $10^{-3}$, for which the required ideal per-bit SNR is $$\left. \frac{E_b}{N_0} \right|_{L,1} = 10.87 \text{ dB.}$$

For curve 726, with no compensation (only amplitude and phase correction), the minimum total degradation is 6.01 dB at an OBO of 4.60 dB. Using the RLS Volterra equalizer without ACI compensation as seen in curve 724, the minimum total degradation can be reduced by 0.91 dB and the optimum OBO can be decreased by 1.3 dB. The use of a Volterra canceller, as seen in curve 722, gives an additional 0.21 dB reduction in the minimum total degradation. As with 16QAM, significant gains are achieved with the RLS equalizer and canceller that incorporate ACI compensation. The RLS Volterra equalizer with ACI compensation, as seen in curve 720, reduces the minimum total degradation to 4.26 dB at an OBO of 2.85 dB. As seen with curve 718, an additional reduction in the minimum total degradation of 0.28 dB is possible with the RLS Volterra canceller that incorporates ACI compensation.

As a performance bound, the RLS Volterra canceller with ACI compensation may be included when feeding more correct decisions to a nonlinear interference estimation $\hat{I}_m^{(3)}(n)$ as will be described in more detail below. The excellent performance of this ideal case verifies the accuracy with which the nonlinear ISI and ACI can be estimated by using a 3rd-order adaptive RLS Volterra filter with double-sided memory of three symbols. It also suggests that there is still 0.9 dB improvement to be gained by providing decisions that are more reliable than the preliminary $\hat{a}_{m,n}^{(0)}$. Iterative techniques may also be used to narrow this performance gap.

Two examples of simulated performance for a four-carrier system having a nonlinear HPA will now be described with reference to FIGS. 8A-8B. Of the two examples, one is drawn to an edge carrier scheme whereas the other is drawn to a non-edge carrier scheme.

Figure 8A:
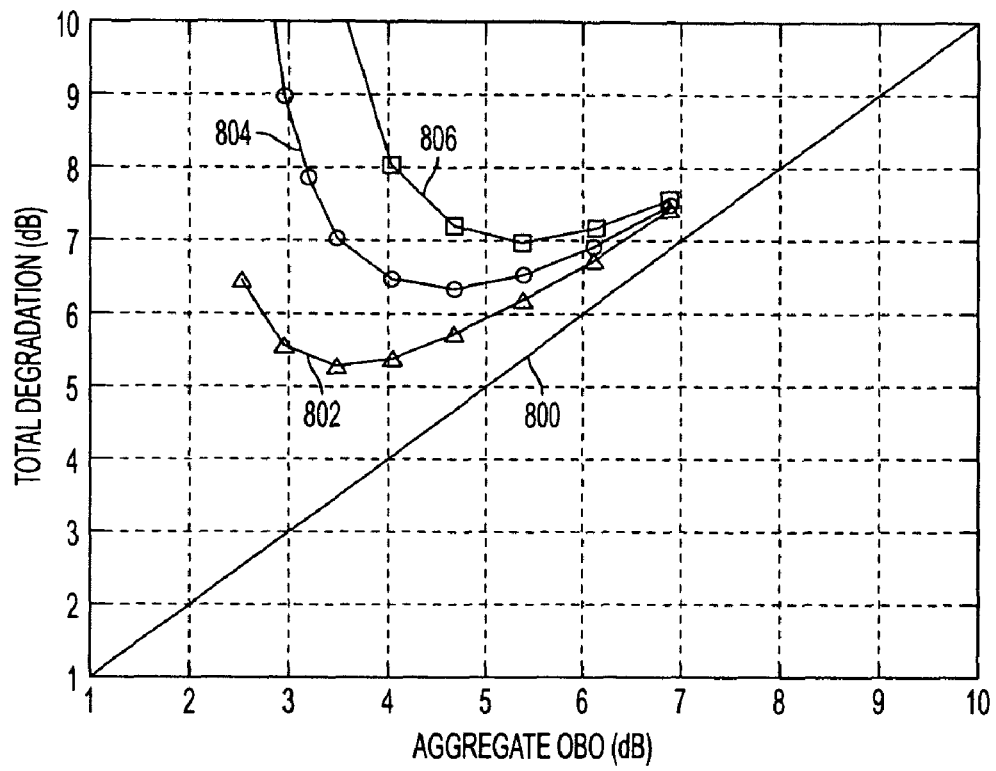
FIG. 8A illustrates compared degradation for a plurality of implementations for a four-carrier system sharing a single HPA.

FIG. 8A shows the total signal degradation in dB as a function of the output back-off in dB. The system used to generate the outputs represented in FIG. 8A is a four-carrier 16APSK system using carrier spacing of $\Delta f=1.257*T_s^{-1}$, roll-off of 0.25, and an edge carrier. In the system used to generate the outputs represented in FIG. 8A, the target uncoded bit error rate is $10^{-3}$.

Curve 800 is the results for a linear transmitter over a single-carrier. Curve 806 is the results for the four-carrier 16APSK system without any compensation. Curve 804 is the results for the four-carrier 16APSK system using a RLS Volterra equalizer in a conventional manner, wherein calculation of values from the Volterra equalizer uses an RLS method. Curve 802 is the results for the four-carrier 16APSK system using a RLS Volterra equalizer with ACI compensation in accordance with an aspect of the present invention.

Comparing curves 802, 804 and 806, it is clear that as the level of compensation increases, the total signal degradation decreases. From no compensation in curve 806, conventional RLS Volterra equalizer of curve 804 shows improvement. The smallest amount of degradation is achieved for RLS Volterra equalizer with ACI compensation of curve 802.

Figure 8B:
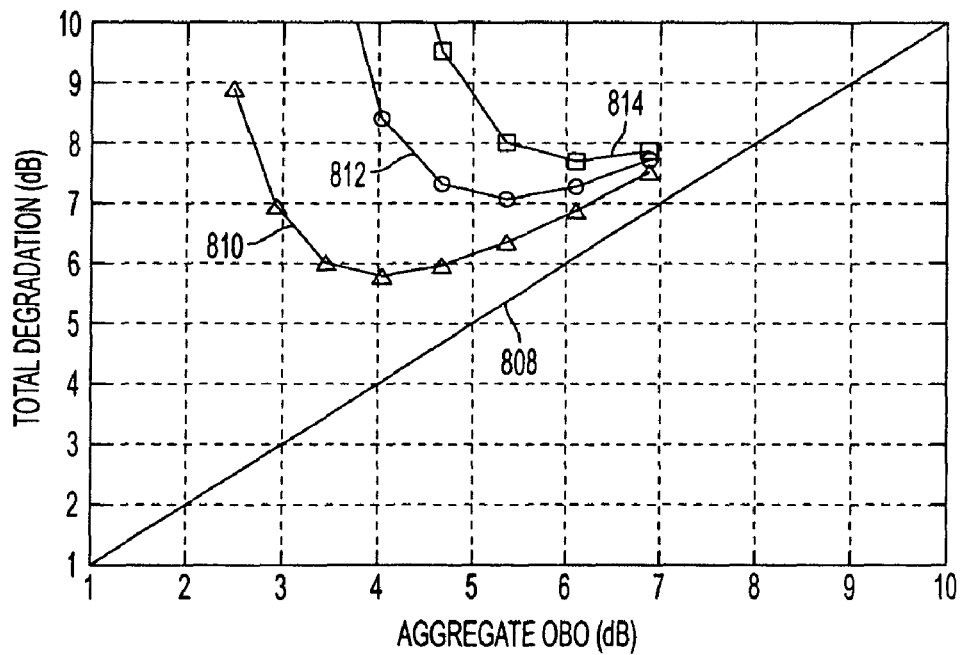
FIG. 8B illustrates compared degradation for a plurality of implementations for a four-carrier system sharing a single HPA.

FIG. 8B shows the total signal degradation in dB as a function of the output back-off in dB. The system used to generate the outputs represented in FIG. 8B is a four-carrier 16APSK system using carrier spacing of $\Delta f=1.257*T_s^{-1}$, roll-off of 0.25, and a non-edge carrier. In the system used to generate the outputs represented in FIG. 8B, the target uncoded bit error rate is $10^{-3}$.

Curve 808 is the results for a linear transmitter over a single-carrier. Curve 814 is the results for the four-carrier 16APSK system without any compensation. Curve 812 is the results for the four-carrier 16APSK system using a RLS Volterra equalizer in a conventional manner, wherein calculation of values from the Volterra equalizer uses an RLS method. Curve 810 is the results for the four-carrier 16APSK system using a RLS Volterra equalizer with ACI compensation in accordance with an aspect of the present invention.

Comparing curves 810, 812 and 814, it is clear that as the level of compensation increases, the total signal degradation decreases. From no compensation in curve 814, conventional RLS Volterra equalizer of curve 812 shows improvement. The smallest amount of degradation is achieved for RLS Volterra equalizer with ACI compensation of curve 810.

The pattern of results in FIGS. 8A-8B is similar to what is observed in the two-carrier case discussed above with reference to FIGS. 7A-7B. Namely, there is significant gain achieved by using a Volterra filter in accordance with aspects of the present invention as compared with conventional systems that mitigate nonlinear ISI only: 1.3 dB reduction in minimum total degradation and 1.3 dB reduction in optimum OBO. More improvement is expected with tighter spacing of channels and when using higher-level signal constellation such as in 16QAM and 32APSK.

The performance of compensation techniques in accordance with the present invention were investigated in the presence of DVB-S2 LDPC code. Results are provided for a DVB-S2 short frame (16200 coded bits) and a code rate of ⅘. The target coded bit error rate is $10^{-5}$, for which the required ideal per-bit $$SNR \frac{E_b}{N_0}\bigg|_{L,1}$$

is 7.45 dB for 16APSK. An example of simulated performance for a two-carrier system having a nonlinear Saleh HPA will now be described with reference to FIG. 9. The example is drawn to a 16APSK modulation scheme.

Figure 9:
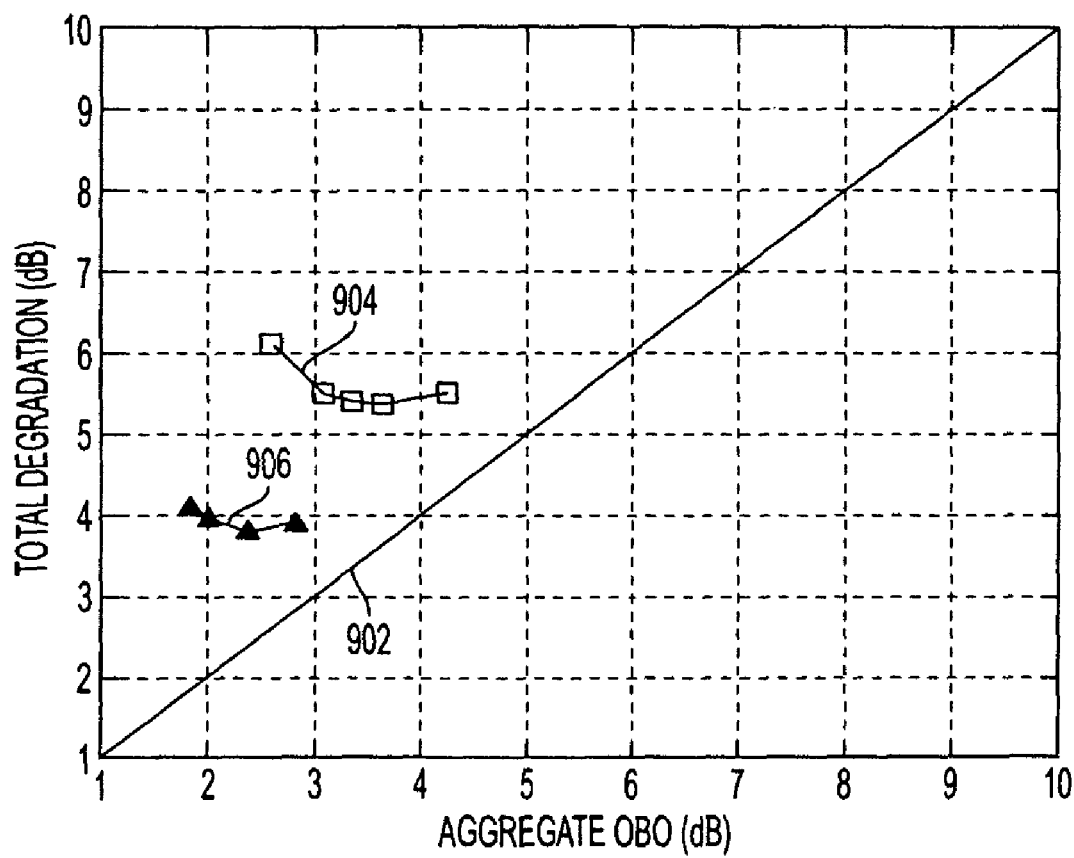
FIG. 9 illustrates compared degradation for a plurality of implementations for a two-carrier system sharing a single HPA with a spacing of $\Delta f = 1.10 * T_s^{-1}$.

FIG. 9 shows the total signal degradation in dB as a function of the output back-off in dB. The system used to generate the outputs represented in FIG. 9 is a two-carrier 16APSK system using carrier spacing of $\Delta f=1.257*T_s^{-1}$ and roll-off of 0.25. In the system used to generate the outputs represented in FIG. 9, the target coded bit error rate is $10^{-5}$.

Curve 902 is the results for a linear transmitter over a single-carrier. Curve 904 is the results for the two-carrier 16APSK system without any compensation. Curve 906 is the results for the two-carrier 16APSK system using a RLS Volterra canceller with ACI compensation in accordance with an aspect of the present invention.

Comparing curves 904 and 906, it is clear that as the level of compensation increases, the total signal degradation decreases. From no compensation in curve 904, RLS Volterra canceller with ACI compensation of curve 906 shows significant improvement.

FIG. 9 illustrates the total degradation versus OBO when the Saleh HPA is shared by two carriers modulated by DVB-S2 LDPC coded 16APSK. The presence of the powerful channel code makes the total degradation for the coded system better than the uncoded system. Despite the powerful channel code, the proposed RLS Volterra canceller with ACI compensation provides a large reduction in the minimum total degradation relative to no compensation: approximately 1.6 dB. Also, the optimal OBO level is reduced by approximately 1.2 dB.

It should be noted that the modulation schemes QAM and APSK are used for illustration purposes. Systems that employ other modulations can benefit from aspects of the invention. In addition, aspects of the present invention can be applied in a straightforward manner to systems with stronger nonlinearity than the third order as well as those of memory span than is longer than three symbols. The RLS adaptation is an example method, yet other adaptation algorithms can also be used.

A more mathematically detailed discussion of a communication system in accordance with aspects of the present invention will now be provided.

Starting in transmitter section 102 of communication system 100 of FIG. 1, modulated signal 158 and modulated signal 160 can be represented by $$a_m(t) = \sum_{k=-\infty}^{\infty} a_{m,k} \delta(t - kT_s - \varepsilon_m T_s), \quad (2)$$

where $\{a_{m,k}; m=1, \ldots, M_c\}$ are sets of complex-valued data symbols, $\delta(t)$ is the Dirac delta function, and $\varepsilon_m$ represents the normalized difference in signal arrival times. Modulated signal 158 would be $a_1(t)$ and modulated signal 160 would be $a_{M_c}(t)$.

Modulated signal 158 is filtered by filter 118 to get filtered signal 162. Modulated signal 160 is filtered by filter 120 to get filtered signal 164. Filtered signal 162 and filtered signal 164 can be represented by $$s_m(t) = \int_{-\infty}^{\infty} a_m(t-\tau) p_{m,T}(\tau) d\tau, \quad (3)$$

where filtered signal 162 would be $s_1(t)$ and filtered signal 164 would be $S_{M_c}(t)$. Filtered signal 162 and filtered signal 164 are then frequency-translated by mixer 122 and mixer 124 respectively. Carrier signal 170 and carrier signal 172 are added at adder 126 to get output signal 174 represented by $$s_c(t) = \sum_{m=1}^{M_c} s_m(t) \frac{\exp(j(2\pi f_m t + \theta_m))}{\sqrt{M_c}}, \quad (4)$$

where $f_m$, $\theta_m$ are the center frequency and carrier phase of the m-th carrier, respectively.

Amplifier 128 amplifies output signal 174 to transmit signal 176. Amplifier 128 is modeled as a nonlinear memoryless device and transmit signal 176 can be represented by power series $$s_{NL}(t) = \sum_{l=0}^{\infty} \gamma^{(2l+1)} [s_c(t)]^{l+1} [s_c^*(t)]^l, \quad (5)$$

where $\gamma^{(2l+1)}$ is a complex valued coefficient that accounts for AM/AM and AM/PM distortions.

For analysis purposes, transmit signal 176 is contaminated with standard additive white Gaussian noise represented by noise signal 178 or n(t) with single-sided power spectral density of $N_0$ (Watt/Hz). Received signal r(t) 180 is accordingly the sum of transmit signal 176 and noise signal 178, namely r(t)=s(t)+n(t).

Upon encountering mixer 132 and mixer 134, received signal 180 is down-mixed to received carrier signal 186 and received carrier signal 188, respective to mixer 132 and mixer 134. Received carrier signal 186 is filtered by filter 136 to produce filtered carrier signal 190 and received carrier signal 188 is filtered by filter 138 to produce filtered carrier signal 192. Filtered carrier signal 190 and filtered carrier signal 192 can be represented by $$x_m(t) = \int_{-\infty}^{\infty} r(t-\tau) \sqrt{M_c} \exp(-j(2\pi f_m t + \theta_m)) p_{m,R}(\tau) d\tau. \quad (6)$$

Filtered carrier signal 190 is sampled by sampler 140 to sampled signal 194 and filtered carrier signal 192 is sampled by sampler 142 to sampled signal 196. Sampler 140 and sampler 142 operate at the symbol rate. Sampled signal 194 and sampled signal 196 can be represented by $$x_m((n+\varepsilon_m)T_s). \quad (7)$$

Sampled signal 194 and sampled signal 196 are passed to compensator 144, which generates compensated signal 151 and compensated signal 153. Compensated signal 151 and compensated signal 153 can be represented by $$y_m((n+\varepsilon_m)T_s). \quad (8)$$

The nonlinear interference caused by amplifier 128 can be characterized using generalized Volterra kernels of the third-order, defined as $$h_{bcde}^{(3)}(t_1, t_2, t_3; f) = \quad (9)$$

$$\int_{-\infty}^{\infty} p_{b,T}(t_1 - \tau) p_{c,T}(t_2 - \tau) p_{d,T}^*(t_3 - \tau) p_{e,R}(\tau) e^{j2\pi f \tau} d\tau,$$

where b, c, d, and e range from 1 to the number of carriers of output. The subscripts denote the three transmit filters involved in the third-order product as well as the receive filter. Additionally, there is dependence on the frequency parameter, which will be a function of the spacing between carriers.

For the sake of simplicity, the case of interference in two carriers will be discussed. This is not meant to be limiting as the analysis additionally extends to a plurality of carriers. Third-order ISI at the first branch of an example receive filter bank can be represented as $$ISI_1^{(3)} = \frac{\gamma^{(3)}}{2} \quad (10)$$

$$\sum_{k_1=-\infty}^{\infty} \sum_{k_2=-\infty}^{\infty} \sum_{k_3=-\infty}^{\infty} a_{1,n-k_1} a_{1,n-k_2} a_{1,n-k_3}^* h_{1111}^{(3)}(k_1 T_s, k_2 T_s, k_3 T_s; 0).$$

As there is an adjacent carrier, there is ACI. The nonlinearity of transmission section 102 results in several terms contributing to overall ACI in receiver section 104. Third-order ACI at the first branch of an example receive filter bank associated with zero frequency can be represented as $$ACI_1^{(3)}(0) = \frac{\gamma^{(3)}}{2} \sum_{k_1=-\infty}^{\infty} \sum_{k_2=-\infty}^{\infty} \sum_{k_3=-\infty}^{\infty} a_{1,n-k_1} a_{2,n-k_2} \quad (11)$$

$$a_{2,n-k_3}^* h_{1221}^{(3)}(k_1 T_s, (k_2 - \Delta\varepsilon)T_s, (k_3 - \Delta\varepsilon)T_s; 0).$$

Third-order ACI at the first branch of an example receive filter bank associated with $+\Delta f$ can be represented as $$ACI_1^{(3)}(+\Delta f) = \quad (12)$$

$$\frac{\gamma^{(3)}}{2} e^{+j(2\pi f(n+\varepsilon_1)T_s + \Delta\theta)} \Bigg[ 2 \sum_{k_1=-\infty}^{\infty} \sum_{k_2=-\infty}^{\infty} \sum_{k_3=-\infty}^{\infty} a_{1,n-k_1} a_{2,n-k_2} a_{2,n-k_3}^*$$

$$h_{1221}^{(3)}(k_1 T_s, (k_2 - \Delta\varepsilon)T_s, (k_3 - \Delta\varepsilon)T_s; +\Delta f) +$$

$$\sum_{k_1=-\infty}^{\infty} \sum_{k_2=-\infty}^{\infty} \sum_{k_3=-\infty}^{\infty} a_{2,n-k_1} a_{2,n-k_2} a_{2,n-k_3}^*$$

$$h_{2221}^{(3)}((k_1 - \Delta\varepsilon)T_s, (k_2 T_s - \Delta\varepsilon), (k_3 - \Delta\varepsilon)T_s; +\Delta f) \Bigg]$$

Third-order ACI at the first branch of an example receive filter bank associated with $-\Delta f$ can be represented as $$ACI_1^{(3)}(-\Delta f) = \frac{\gamma^{(3)}}{2} e^{-j(2\pi f(n+\varepsilon_1)T_s + \Delta\theta)} f) * \quad (13)$$

-continued $$\sum_{k_1=-\infty}^{\infty}\sum_{k_2=-\infty}^{\infty}\sum_{k_3=-\infty}^{\infty} a_{1,n-k_1} a_{1,n-k_2}$$

$$a_{2,n-k_3}^* h_{1121}^{(3)}(k_1 T_s, k_2 T_s, (k_3-\Delta\varepsilon)T_s; -\Delta f).$$

Third-order ACI at the first branch of an example receive filter bank associated with $+2\Delta f$ can be represented as $$ACI_1^{(3)}(+2\Delta f) = \qquad (14)$$

$$\frac{\gamma^{(3)}}{2} e^{+2j(2\pi\Delta f(n+\varepsilon_1)T_s+\Delta\theta)} * \sum_{k_1=-\infty}^{\infty}\sum_{k_2=-\infty}^{\infty}\sum_{k_3=-\infty}^{\infty} a_{2,n-k_1} a_{2,n-k_2}$$

$$a_{1,n-k_3}^* h_{1121}^{(3)}((k_1-\Delta\varepsilon)T_s, (k_2-\Delta\varepsilon)T_s, k_3 T_s; +2\Delta f),$$

where $\Delta f = f_2 - f_1$; $\Delta\theta = \theta_2 - \theta_1$; $\Delta\varepsilon = \varepsilon_2 - \varepsilon_1$ and subscripts 1 and 2 denote carriers 1 and 2 of an example communication system 100.

As seen in equation (11), there is an ACI term that is centered at zero frequency. This ACI term is caused by non-linear interactions between symbols in an adjacent carrier. This ACI term is created as a result of nonlinear interactions between the adjacent carriers. However, this ACI term is independent of the carrier spacing, or the spacing to the adjacent carrier, which makes compensating for nonlinear ACI a much harder problem. Specifically, this nonlinear ACI term will not reduce even if the channels are spaced far apart.

Combining the interferences above yields an expression for sampled signal 194 in accordance with equation (7) as follows $$x_1((n+\varepsilon_1)T_s) = ISI_1^{(1)} + ACI_1^{(1)}(+\Delta f) + ISI_1^{(3)} + ACI_1^{(3)}(0) + ACI_1^{(3)}(+\Delta f) + ACI_1^{(3)}(-\Delta f) + ACI_1^{(3)}(+2\Delta f) + n_1((n+\varepsilon_1)T_s), \qquad (15)$$

where $n_m((n+\varepsilon_m)T_s)$ is a zero-mean colored complex-valued Gaussian process. Specifically, $n_m((n+\varepsilon_m)T_s)$ represents noise signal 178 as a component of receive signal 180 after mixing by mixer 132, filtering by filter 136, and sampling by sampler 140.

Using the above definition of interference, a Volterra filter 200 as in FIG. 2 can be implemented in accordance with an aspect of the present invention to compensate for ISI and ACI in received signals on multiple carriers. An example Volterra filter 200 in accordance with the present invention uses a Volterra series expansion truncated to third-order nonlinearity and truncated in time to a double-sided memory of length L symbols. Volterra filter 200 generates filtered output 254 which can be represented as $$y_{1,VF}^{(3)} \underline{w}_1^H \cdot \tilde{\underline{u}}_{1,NLC}^{(3)}(n), \qquad (16)$$

where $w_1^H$ is a vector of complex-valued coefficients whose components are represented by weight vector 232, weight vector 234, weight vector 236, and weight vector 238, and $\tilde{\underline{u}}_{1,NLC}^{(3)}(n)$ is a vector whose components are represented by output symbol vector 224, output symbol vector 226, output symbol vector 228, and output symbol vector 230 containing the products and cross-products of more than one input vector $u_m(n)$; $m=1, \ldots M_c$ represented by input symbol vector 220 and input symbol vector 222.

The first step in calculating values to be used by Volterra filter 200 is to create vector $\tilde{\underline{u}}_{1,NLC}^{(3)}(n)$. This is started with input symbol vector 220 and input symbol vector 222, which can be represented as $u_m(n)$ with m denoting the m-th input vector of size L×1. Then the vectors of the form $\underline{u}_m(n)$ are taken and matrices with size L×L of second-order products of Volterra filter 200 are generated as $$U_{bc}^{(2)}(n) = \underline{u}_b(n) \cdot \underline{u}_c^T(n) \qquad (17)$$

where b and c are coefficients ranging from 1 to the number of carriers.

Third-order products of Volterra filter 200 are generated by creating with L matrices, each of size L×L, with the matrices multiplying an associated second-order product as in equation (17) with the complex conjugate of individual terms of an input vector $\underline{u}_d$ as follows $$U_{bcd,1}^{(3)}(n) = U_{bc}^{(2)}(n) \cdot \underline{u}_d^*(n)|_{11}; \qquad (18)$$

$$U_{bcd,2}^{(3)}(n) = U_{bc}^{(2)}(n) \cdot \underline{u}_d^*(n)|_{21};$$

$$\vdots$$

$$U_{bcd,L}^{(3)}(n) = U_{bc}^{(2)}(n) \cdot \underline{u}_d^*(n)|_{L1};$$

where d is a coefficient ranging from 1 to the number of carriers and notation $S|_{ij}$ indicates the ij-th element of S.

Finally, a vector of size $L^3 \times 1$ comprised of all individual terms of matrices of equation (18) is formed as follows $$\underline{u}_{bcd}^{(3)}(n) = \begin{bmatrix} U_{bcd,1}^{(3)}(n)|_{11} \\ \vdots \\ U_{bcd,1}^{(3)}(n)|_{LL} \\ U_{bcd,2}^{(3)}(n)|_{11} \\ \vdots \\ U_{bcd,2}^{(3)}(n)|_{LL} \\ U_{bcd,L}^{(3)}(n)|_{11} \\ \vdots \\ U_{bcd,L}^{(3)}(n)|_{LL} \end{bmatrix}. \qquad (19)$$

Vector $\underline{u}_{bcd}^{(3)}(n)$ of equation (19) is the basic component of third-order nonlinear combiner 204 of Volterra filter 200.

Multiple representations of $\tilde{\underline{u}}_{1,NLC}^{(3)}(n)$ can be used to illustrate different levels of interference modeling. A first example third-order nonlinear combiner 204 incorporates only $ISI_1^{(1)}$ and $ISI_1^{(3)}$, and is represented as $$\tilde{\underline{u}}_{1,NLC}^{(3)}(n) = \begin{bmatrix} \underline{u}_1(n) \\ \underline{u}_{111}^{(3)}(n) \end{bmatrix}. \qquad (20)$$

In equation (20) each term is an ISI term because they are both intrinsic to a single carrier. The first term in equation (20) is the linear component of ISI, whereas the second term is a third order (a non-linear) component of ISI. Therefore, it is clear that this aspect of the present invention deals with both linear and nonlinear ISI.

A second example third-order nonlinear combiner 204 in accordance with an aspect of the present invention incorporates only $ISI_1^{(1)}$, $ACI_1^{(1)}(+\Delta f)$, $ISI_1^{(3)}$, and $ACI_1^{(3)}(0)$, and is represented as $$\tilde{\underline{u}}_{1,NLC}^{(3)}(n) = \begin{bmatrix} \underline{u}_1(n) \\ \underline{u}_2(n) \cdot e^{j(2\pi\Delta f(n+\varepsilon_1)T_s + \Delta\theta)} \\ \underline{u}_{111}^{(3)}(n) \\ \underline{u}_{122}^{(3)}(n) \end{bmatrix}'. \quad (21)$$

A third example third-order nonlinear combiner 204 in accordance with an aspect of the present invention incorporates $ISI_1^{(1)}$, $ACI_1^{(1)}(+\Delta f)$, $ISI_1^{(3)}$, $ACI_1^{(3)}(0)$, and $ACI_1^{(3)}(\pm\Delta f)$, and is represented as $$\tilde{\underline{u}}_{1,NLC}^{(3)}(n) = \begin{bmatrix} \underline{u}_1(n) \\ \underline{u}_2(n) \cdot e^{j(2\pi\Delta f(n+\varepsilon_1)T_s + \Delta\theta)} \\ \underline{u}_{111}^{(3)}(n) \\ \underline{u}_{122}^{(3)}(n) \\ \underline{u}_{121}^{(3)}(n) \cdot e^{j(2\pi\Delta f(n+\varepsilon_1)T_s + \Delta\theta)} \\ \underline{u}_{222}^{(3)}(n) \cdot e^{j(2\pi\Delta f(n+\varepsilon_1)T_s + \Delta\theta)} \\ \underline{u}_{111}^{(3)}(n) \cdot e^{-j(2\pi\Delta f(n+\varepsilon_1)T_s + \Delta\theta)} \end{bmatrix}'. \quad (22)$$

Equations (20), (21) and (22) define an interference model for a first branch of communication system 100. An interference model for a second branch of communication system 100 may be obtained by interchanging subscripts 1 and 2 in equations (20), (21) and (22).

Equation (20) represents a nonlinear combiner 204 operating without compensation for ACI. Specifically, the expression for $\tilde{u}_{1,NLC}^{(3)}(n)$ in equation (20) represents a single carrier case in accordance with conventional methods.

As mentioned above, interference estimates from equations (21) and (22) represent expressions for a two-carrier case. Equations (21) and (22) are not meant to be limiting and may be similarly calculated for cases involving a plurality of carriers.

Returning to FIG. 2, symbol vector 220 corresponds to a vector of equation (22) for one carrier (of a plurality of carriers), whereas symbol vector 222 corresponds to a vector of equation (22) for another carrier (in the plurality of carriers). Each carrier will have its own nonlinear combiner, which will have its own corresponding filtered output $y_{1,VF}^{(3)}(n)$ 254. Further, weight vectors 232, 234, 236 and 238 will correspond to: an inverse of the interference for each respective carrier, in the case of a Volterra filter being used as Volterra equalizer 300, for example as discussed above with reference to FIG. 3A; or the interference associated with each respective carrier, in the case of a Volterra filter being used as Volterra canceller 302, for example as discussed above with reference to FIG. 3B.

In accordance with another aspect of the present invention, as discussed above with reference to equation (22) the Volterra filter addresses not only linear and nonlinear ISI, but linear and nonlinear ACI. The first term in the vector of equation (22) corresponds to the linear ISI component, whereas the second term corresponds to the linear ACI component. The third term in the vector of equation (22) corresponds to a nonlinear ISI component. The next four terms in the vector of equation (22) correspond to nonlinear ACI components. Therefore, in accordance with an aspect of the present invention, a Volterra filter addresses linear and nonlinear ISI in addition to linear and nonlinear ACI. By selecting which terms to include in the vector of equation (22) nonlinear combiner 204 may be designed to address desired interference components.

A nonlinear combiner 204 in accordance with an aspect of the present invention, may be designed to compensate for any or all linear and nonlinear ISI in addition to linear and nonlinear ACI components. If some components are determined not to be relatively significant, then such components may be ignored (the corresponding terms being left out of the vector of equation (22)) in order to save processing power and time. In some embodiments, each of the linear ISI and ACI and the nonlinear ISI an ACI components may be addressed. In some embodiments, only the linear ISI and ACI components may be addressed. In some embodiments, a combination of linear, nonlinear, ISI and ACI components may be addressed.

As the number of interference components that are addressed increases, the complexity and power consumption of nonlinear combiner 204 increases. Referring to FIG. 7A, compare for example, curves 706 and 708 with curves 702 and 704, respectively. Curves 706 and 708 correspond to example cases of a nonlinear combiner (equalizer and canceller respectively) using a vector of equation (20), wherein only a linear and a third order nonlinear component of ISI are addressed. Curves 702 and 704 correspond to example cases of a nonlinear combiner (equalizer and canceller respectively) using a vector of equation (22), wherein linear and nonlinear ISI components in addition to linear and nonlinear components of ACI are addressed. Clearly, as evidenced by curves 702 and 704, a much clearer signal is generated when the vector for the nonlinear combiner accounts for interference that is induced from adjacent carriers, i.e., ACI.

Volterra filter 200 must additionally calculate coefficients $w_1^H$ to minimize error between filtered output $y_{1,VF}^{(3)}(n)$ 254 and a desired sequence $d_{1,n}$ in the mean-squared sense represented as $$\zeta_1^{(MSE)}(n) = E\{|d_{1,n} - \underline{w}_1^H(n) \cdot \tilde{\underline{u}}_{1,NLC}^{(3)}(n)|^2\}. \quad (23)$$

An optimum set of coefficients $\underline{w}_1^H$ can be calculated as $$\underline{w}_{1,MMSE}(n) = R_{\tilde{u}\tilde{u}}^{-1} \cdot \underline{p}_{\tilde{u}d}, \quad (24)$$

where $$R_{uu} = E\{\tilde{\underline{u}}_{1,NLC}^{(3)}(n) \cdot (\tilde{\underline{u}}_{1,NLC}^{(3)}(n))^H\}. \quad (25)$$

$$\underline{p}_{\tilde{u}d} = E\{\tilde{\underline{u}}_{1,NLC}^{(3)}(n) \cdot d_{1,n}^*\}.$$

Unfortunately, computation of optimum coefficients using equations (24) and (25) requires knowledge of Volterra kernels of equation (9) and matrix inversion. To simplify calculation, stochastic gradient-based algorithms may be used, non-limiting examples of which include least mean squares (LMS) and recursive least squares (RLS).

Calculation of coefficients $w_1^H$ will be described using an RLS method as described below. The objective function to minimize replaces equation (23) and minimizes the least-squares value of the error, specifically $$\xi_1^{(LS)}(n) = \sum_{i=1}^n \lambda^{n-1} \cdot |d_{1,i} - \underline{w}_1^H \cdot \tilde{\underline{u}}_{1,NLC}^{(3)}(n)|^2, \quad (26)$$

where parameter $\lambda$ is the forgetting factor and is chosen in the range $0 \leq \lambda \leq 1$. The optimum coefficients to minimize the cost function of equation (26) can be computed recursively using the following expressions $$k(n) = \frac{\lambda^{-1} \cdot P(n-1) \cdot \tilde{u}_{1,NLC}^{(3)}(n)}{1 + \lambda^{-1} \cdot (\tilde{u}_{1,NLC}^{(3)}(n))^H \cdot P(n-1)\tilde{u}_{1,NLC}^{(3)}(n)} \quad (27)$$

$$\alpha(n) = d_{1,n} - \underline{w}_1^H(n-1) \cdot \tilde{u}_{1,NLC}^{(3)}(n) \quad (28)$$

$$\underline{w}_1(n) = \underline{w}_1(n-1) + \underline{k}(n) \cdot \alpha^*(n) \quad (29)$$

$$P(n) = \lambda^{-1} \cdot P(n-1) - \lambda^{-1} \cdot \underline{k}(n) \cdot (\tilde{u}_{1,NLC}^{(3)}(n))^H \cdot P(n-1) \quad (30)$$

Other RLS implementations may be used to calculate coefficients $w_1^H$.

Volterra filter 200 in accordance with an aspect of the present invention may be operated as example Volterra equalizer 300 as illustrated in FIG. 3A. In Volterra equalizer 300, filter weights are adaptively adjusted so as to provide the best inverse of the nonlinear interference impulse response. Specifically, input vectors, such as input vector 220 and input vector 222, are samples of receive filter output represented as $$\underline{u}_m(n) = \begin{bmatrix} x_m\left(\left(n - \frac{L-1}{2} + \varepsilon_m\right)\right)T_s \\ x_m\left(\left(n - \frac{L-1}{2} + 1 + \varepsilon_m\right)\right)T_s \\ \vdots \\ x_m((n + \varepsilon_m))T_s \\ \vdots \\ x_m\left(\left(n + \frac{L-1}{2} - 1 + \varepsilon_m\right)\right)T_s \\ x_m\left(\left(n + \frac{L-1}{2} + \varepsilon_m\right)\right)T_s \end{bmatrix}; m = 1, \ldots, M_c \quad (31)$$

$$d_{1,n} = a_{1,n}. \quad (32)$$

Input vectors $u_m(n)$; $m=1, \ldots M_c$, as seen in equation (31), are used to form the nonlinear combiner $\tilde{u}_{1,NLC}^{(3)}(n)$. Volterra equalizer 300 then uses RLS in accordance with equations (27-30) above to recursively minimize the error between equalizer output 318 and training symbol $\alpha_{1,n}$ in the least-squares sense.

During normal operating mode, Volterra equalizer 300 is applied to the receive filter bank to generate improved filter output $$y_i((n+\epsilon_1)T_s) = \underline{w}_{1,RLS}^H \tilde{\underline{u}}_{1,NLC}^{(3)}(n), \quad (33)$$

where $w_{1,RLS}^H$ is the vector of coefficients reached using RLS as described above. Final symbol decisions are made using threshold detection or are selected to have minimal distance relative to the nominal signal constellation represented as $$\hat{a}_{1,n} = \min_{i=1,\ldots,M} |y_1((n+\varepsilon_1)T_s) - \rho_{1,i}^{nominal}|, \quad (34)$$

where M is the size of the modulation alphabet and $\rho_{1,i}^{nominal}$ is the nominal position of the i-th symbol in the constellation of the given modulation scheme.

Alternatively, Volterra filter 200 in accordance with an aspect of the present invention may be operated as example Volterra canceller 302 as illustrated in FIG. 3B. In Volterra canceller 302, filter weights are adaptively adjusted so as to provide the best estimate of the nonlinear impulse response. Specifically, input vectors, such as input vector 220 and input vector 222, are samples of the actual training symbols represented as $$\underline{u}_m(n) = \begin{bmatrix} a_{m,n-\frac{L-1}{2}} \\ a_{m,n-\frac{L-1}{2}+1} \\ \vdots \\ a_{m,n} \\ \vdots \\ a_{m,n-\frac{L-1}{2}-1} \\ a_{m,n-\frac{L-1}{2}} \end{bmatrix}; m = 1, \ldots, M_c \quad (35)$$

$$d_{1,n} = x_1((n + \varepsilon_1)T_s). \quad (36)$$

Input vectors $u_m(n)$; $m=1, \ldots M_c$, as seen in equation (35), are used to form the nonlinear combiner $\tilde{u}_{1,NLC}^{(3)}(n)$. Volterra canceller 302 then uses RLS in accordance with equations (27-30) above to recursively minimize the error between canceller filter output 318 and receive filter output $x_1((n+\epsilon_1)T_s)$ in the least-squares sense.

During normal operating mode, Volterra canceller 302 first generates zero-th iteration) data estimates for both carriers $\hat{a}_{m,n}^{(0)}$; $m=1, 2$. The estimates are made by selecting the symbol with the minimum distance relative to the centroids of the distorted signal constellation represented as $$\hat{a}_{m,n}^{(0)} = \min_{i=1,\ldots,M} |x_m((n + \varepsilon_m)T_s) - \rho_{m,i}^{centroid}|, \quad (37)$$

where $m=1, 2$. Input vectors may be formed using the zero-th iteration estimates of equation (37) and are represented as $$\underline{u}_m(n) = \begin{bmatrix} \hat{a}_{m,n-\frac{L-1}{2}}^{(0)} \\ \hat{a}_{m,n-\frac{L-1}{2}+1}^{(0)} \\ \vdots \\ \hat{a}_{m,n}^{(0)} \\ \vdots \\ \hat{a}_{m,n+\frac{L-1}{2}-1}^{(0)} \\ \hat{a}_{m,n+\frac{L-1}{2}}^{(0)} \end{bmatrix}; m = 1, \ldots, M_c \quad (38)$$

Input vectors $u_m(n)$; $m=1, \ldots M_c$, as seen in equation (35), are used to form the nonlinear combiner $\tilde{u}_{1,NLC}^{(3)}(n)$. Namely the estimate of nonlinear interference can be represented as $$\hat{I}_1^{(3)}(n) = \underline{w}_{1,RLS}^H \cdot \tilde{\underline{u}}_{1,NLC}^{(3)}(n) - \rho_1^{centroid}(\hat{a}_{1,n}^{(0)}), \quad (39)$$

where $w_{1,RLS}$ is the vector of coefficients reached using RLS as described above and $\rho_1^{centroid}(\hat{a}_{1,n}^{(0)})$ is the centroid value associated with estimated symbol ($\hat{a}_{1,n}^{(0)}$). Estimated nonlinear interference of equation (39) is subtracted to produce improved filter output $$y_1((n+\epsilon_1)T_s) = x_1((n+\epsilon_1)T_s) - \hat{I}_1^{(3)}(n) \quad (40)$$

Improved filter output as described by equation (40) may be used to make first-iteration decisions on the transmitted signal by selecting the symbol with the minimum distance relative to the distorted signal constellation represented as $$\hat{a}_{m,n}^{(1)} = \min_{i=1,\ldots,M} |y_1((n+\varepsilon_1)T_s) - \rho_{1,i}^{centroid}|. \quad (41)$$

The process may be iterated by reconstructing nonlinear interference using improved data estimates from the first iteration $\hat{a}_{1,n}^{(1)}$ shown in equation (41). Increasing the iterations in the process may improve performance of the system where subsequent iterations improve the data estimates used in equation (38).

Returning back to FIGS. 7A-9, the OBO is defined as the loss in power, relative to saturation, of the modulated signal, and is measured at the receive RRC filter output after sampling, or the noiseless $x_m((n+\varepsilon_m)T_s)$. Namely, the total degradation, TD (in dB), is defined as $$TD(dB) = OBO(dB) + \frac{E_b}{N_0}\bigg|_{NL,2}(dB) - \frac{E_b}{N_0}\bigg|_{L,1}(dB), \quad (42)$$

where $\frac{E_b}{N_0}\bigg|_{NL,2}$ is the per-bit SNR required when a nonlinear HPA is shared by two carriers, and $$\frac{E_b}{N_0}\bigg|_{L,1}$$

is its counterpart when a perfectly linear HPA is used by a single-carrier, both to achieve the same specified bit error rate. The minimum value of the total degradation, $TD_{min}$, occurring at the optimum modulated OBO, $OBO_{opt}$, is used as the performance figure-of-merit.

Aspects in accordance with the present invention are described with two example adaptive solutions to compensate for linear and nonlinear ISI and ACI. The first example solution performs adaptive inverse modeling of the interference impulse response and then applies an equalizer on the main path of the received signal. The second example solution performs adaptive identification of the interference impulse response and then applies cancellation of the estimated interference.

Aspects of the present invention provides adaptive algorithms so that the solutions are completely blind to unknown transponder HPA characteristics, and can rapidly respond to varying operating back-off level. Prior art mitigates only nonlinear ISI and ignores the impact of nonlinear ACI, which is the dominant source of degradation.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A receiver operable to receive a first signal transmitted on a first carrier and to receive a second signal transmitted on a second carrier, said receiver comprising:
   a first filter arranged to receive the first signal and to generate a first filtered signal;
   a second filter arranged to receive the second signal and to generate a second filtered signal; and
   a nonlinear compensator arranged to output a first compensating signal based on the first filtered signal and the second filtered signal and to output a second compensating signal based on the first filtered signal and the second filtered signal; and
   wherein said nonlinear compensator is operable to reduce one of nonlinear interference within the first filtered signal and nonlinear interference between the first filtered signal and the second filtered signal.

2. The receiver of claim 1, wherein said nonlinear compensator is operable to perform adaptive inverse modeling of the first carrier.

3. The receiver of claim 2, wherein said nonlinear compensator includes an adaptive polynomial filter.

4. The receiver of claim 3, wherein said adaptive polynomial filter comprises a Volterra polynomial filter.

5. The receiver of claim 3, wherein said adaptive polynomial filter is operable to recursively compute coefficients.

6. The receiver of claim 1, wherein said nonlinear compensator is operable to perform adaptive identification of the first carrier and to cancel an estimated adjacent carrier interference.

7. The receiver of claim 6, wherein said nonlinear compensator includes an adaptive polynomial filter.

8. The receiver of claim 7, wherein said adaptive polynomial filter comprises a Volterra polynomial filter.

9. The receiver of claim 8:
   wherein said Volterra polynomial filter is operable to receive a first input vector and a second input vector and to output symbol;
   wherein the first input vector corresponds to the first signal;
   wherein the second input vector corresponds to the second signal; and
   wherein the output symbol is based on a product of the first input vector and a cross-product between the first input vector and the second input vector.

10. The receiver of claim 7, wherein said adaptive polynomial filter is operable to recursively compute coefficients.

11. A method of reducing nonlinear interference comprising:
   receiving, on a first receiver, a first signal transmitted on a first carrier;
   receiving, on a second receiver, a second signal transmitted on a second carrier;
   generating a first filtered signal based on the first signal;
   generating a second filtered signal based on the second signal;
   reducing one of nonlinear interference within the first filtered signal and nonlinear interference between the first filtered signal and the second filtered signal;
   outputting a first compensating signal based on the first filtered signal and the second filtered signal; and
   outputting a second compensating signal based on the first filtered signal and the second filtered signal.

12. The method of claim 11, wherein said reducing nonlinear interference between the first filtered signal and the second filtered signal comprises performing adaptive inverse modeling of the first carrier.

13. The method of claim 12, wherein said performing adaptive inverse modeling of the first carrier comprises performing adaptive inverse modeling with an adaptive polynomial filter.

14. The method of claim 13, wherein said performing adaptive inverse modeling with an adaptive polynomial filter comprises performing adaptive inverse modeling with a Volterra polynomial filter.

15. The method of claim 13, wherein said performing adaptive inverse modeling with an adaptive polynomial filter comprises recursively computing coefficients.

16. The method of claim 11, wherein said reducing nonlinear interference between the first filtered signal and the second filtered signal comprises performing adaptive identification of the first carrier and cancelling an estimated adjacent carrier interference.

17. The method of claim 16, wherein said performing adaptive identification of the first carrier and cancelling an estimated adjacent carrier interference comprises performing adaptive identification of the first carrier and cancelling an estimated adjacent carrier interference with an adaptive polynomial filter.

18. The method of claim 17, wherein said performing adaptive identification of the first carrier and cancelling an estimated adjacent carrier interference with an adaptive polynomial filter comprises performing adaptive identification of the first carrier and cancelling an estimated adjacent carrier interference with a Volterra polynomial filter.

19. The method of claim 18:
wherein said performing adaptive identification of the first carrier and cancelling an estimated adjacent carrier interference with a Volterra polynomial filter comprises receiving a first input vector and a second input vector and outputting a symbol;
wherein the first input vector corresponds to the first signal;
wherein the second input vector corresponds to the second signal; and
wherein the output symbol is based on a product of the first input vector and a cross-product between the first input vector and the second input vector.

20. The method of claim 17, wherein said performing adaptive identification of the first carrier and cancelling an estimated adjacent carrier interference with an adaptive polynomial filter comprises recursively computing coefficients.

* * * * *